United States Patent
Li et al.

(10) Patent No.: US 8,852,455 B2
(45) Date of Patent: Oct. 7, 2014

(54) EUROPIUM-ACTIVATED, BETA-SIALON BASED GREEN PHOSPHORS

(75) Inventors: Yi-Qun Li, Danville, CA (US); Dejie Tao, Fremont, CA (US)

(73) Assignee: Intematix Corporation, Fremont, CA (US)

( * ) Notice: Subject to any disclaimer, the term of this patent is extended or adjusted under 35 U.S.C. 154(b) by 647 days.

(21) Appl. No.: 13/210,667

(22) Filed: Aug. 16, 2011

(65) Prior Publication Data

US 2012/0043503 A1    Feb. 23, 2012

Related U.S. Application Data

(60) Provisional application No. 61/374,383, filed on Aug. 17, 2010.

(51) Int. Cl.
C09K 11/61    (2006.01)
C09K 11/08    (2006.01)
C09K 11/77    (2006.01)

(52) U.S. Cl.
CPC .................. C09K 11/7734 (2013.01)
USPC .............. 252/301.4 H; 252/301.4 F

(58) Field of Classification Search
CPC ........... C09K 11/7734; C09K 11/7728; C09K 11/7731; C09K 11/7774; H01L 33/504; H01L 33/502
USPC ............. 252/301.4 H, 301.4 F; 313/503, 504; 257/98; 349/71
See application file for complete search history.

(56) References Cited

U.S. PATENT DOCUMENTS

| | | | |
|---|---|---|---|
| 4,070,198 A | 1/1978 | Chyung et al. | |
| 5,998,925 A | 12/1999 | Shimizu et al. | |
| 7,311,858 B2 | 12/2007 | Wang et al. | |
| 7,390,437 B2 | 6/2008 | Dong et al. | |
| 7,575,697 B2 | 8/2009 | Li et al. | |
| 7,601,276 B2 | 10/2009 | Li et al. | |
| 7,655,156 B2 | 2/2010 | Cheng et al. | |
| 2006/0027786 A1 | 2/2006 | Dong et al. | |
| 2006/0158090 A1 | 7/2006 | Wang et al. | |
| 2008/0111472 A1 | 5/2008 | Liu et al. | |
| 2009/0050845 A1* | 2/2009 | Hirosaki et al. | ........ 252/301.4 F |
| 2010/0308712 A1 | 12/2010 | Liu et al. | |
| 2011/0198656 A1* | 8/2011 | Emoto et al. | .................... 257/98 |

FOREIGN PATENT DOCUMENTS

WO    2009/142992 A1    11/2009
WO    WO 2009/142992 A1 *  11/2009

OTHER PUBLICATIONS

International Search Report and Written Opinion Jan. 9, 2012 for International Application No. PCT/US2011/0048061, 5 pages.

* cited by examiner

*Primary Examiner* — Carol M Koslow
*Assistant Examiner* — Lynne Edmondson
(74) *Attorney, Agent, or Firm* — David H. Jaffer; Pillsbury Winthrop Shaw Pittman LLP

(57) ABSTRACT

Embodiments of the present invention are directed a β-SiA-lON:$Eu^{2+}$ based green emitting phosphor having the formula $Eu_x(A1)_{6-z}(A2)_zO_yN_{8-z}(A3)_{2(x+z-y)}$, where $0<z\leq4.2$; $0\leq y\leq z$; $0<x\leq0.1$; A1 is Si, C, Ge, and/or Sn; A2 is Al, B, Ga, and/or In; A3 is F, Cl, Br, and/or I. The new set of compounds described by $Eu_x(A1)_{6-z}(A2)_zO_yN_{8-z}(A3)_{2(x+z-y)}$ have the same structure as β-$Si_3N_4$. Both elements A1 and A2 reside on Si sites, and both O and N occupy the nitrogen sites of the β-$Si_3N_4$ crystal structure. A molar quantity (z−y) of the $A3^-$ anion (defined as a halogen) reside on nitrogen sites.

12 Claims, 4 Drawing Sheets

EUROPIUM-ACTIVATED, BETA-SIALON BASED GREEN PHOSPHORS

PRIORITY CLAIM

The present application claims priority to U.S. Provisional Patent Application No. 61/374,383 entitled "Europium activated beta $Si_3N_4$ structure green phosphor," filed Aug. 17, 2010 by Yi-Qun Li et al., which application is incorporated herein in its entirety.

FIELD OF THE INVENTION

Embodiments of the present invention are directed to europium-activated green emitting phosphors having a $\beta$-SiAlON structure.

BACKGROUND OF THE INVENTION

There is a need in the field(s) of optical engineering for red, green, and blue lighting systems in various devices, applications, and technologies. Among these technologies are backlighting sources for display systems, such as plasma displays, and white light sources in general lighting.

What is needed in the art in particular are green-emitting phosphors in various applications, including red, green, and blue (RGB) lighting systems, backlighting displays and warm white-light applications. In these applications it is desirable to have green-emitting phosphors that show high luminous flux and brightness. The present disclosure describes improvements in green-emitting phosphor based on a $\beta$-$Si_3N_4$ structure activated with divalent europium.

SUMMARY OF THE INVENTION

Embodiments of the present invention are directed to new green phosphors based on $\beta$-SiAlON is presented, the new phosphor having the formula $Eu_x(A1)_{6-z}(A2)_zO_yN_{8-z}(A3)_{2(x+z-y)}$, where the values of the parameters x, y, and z have the following relationships:

$0 < z \leq 4.2;$ $0 \leq y \leq z;$ and $0 < x \leq 0.1;$ and where the identities of the elements A1, A2, and A3 are:
  A1 is selected from the group consisting of Si, C, Ge, and Sn;
  A2 is selected from the group consisting of Al, B, Ga, and In; and
  A3 is selected from the group consisting of F, Cl, Br, and I.

The new set of compounds described by $Eu_x(A1)_{6-z}(A2)_zO_yN_{8-z}(A3)_{2(x+z-y)}$ have substantially the same structure as $\beta$-$Si_3N_4$, as will be demonstrated shortly with x-ray diffraction data. Both elements A1 and A2 may reside on Si sites, and both O and N may occupy the nitrogen sites of the $\beta$-$Si_3N_4$ crystal structure. The $Eu^{2+}$ activator atoms are considered to exist in a continuous atomic line parallel to the c-axis at the origin. A stoichiometric quantity (z−y) of the $A3^-$ anion (defined as a halogen) will also reside on an N site, and the remaining (2x+z−y) moles of $A3^-$ may exist continuously, atomically parallel to the c-axis at the origin just like $Eu^{2+}$.

DETAILED DESCRIPTION OF THE INVENTION

Figure 1:
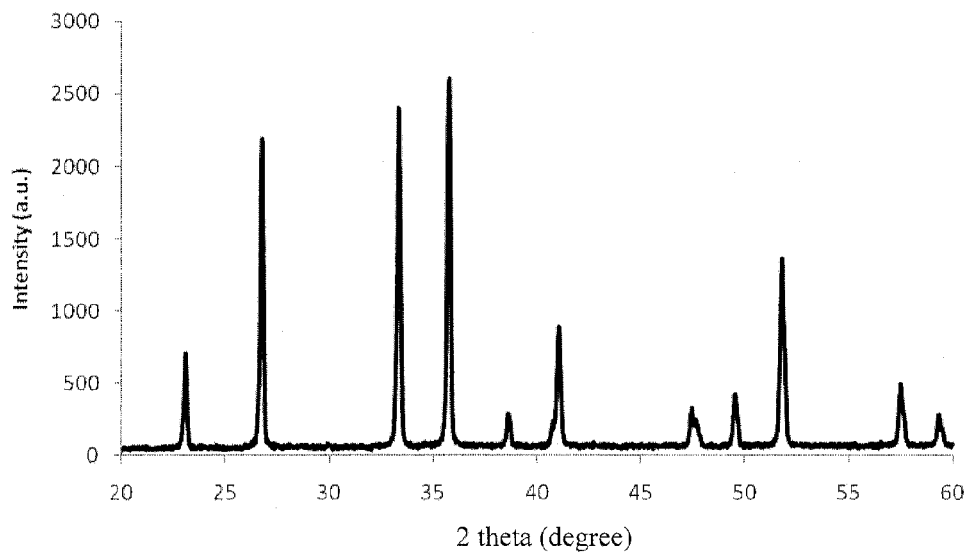
FIG. 1 is an x-ray diffraction pattern of a phosphor having the composition $Eu_{0.02}Si_{5.5}Al_{0.5}O_{0.5}N_{7.5}F_{0.04}$. This figure shows that the x-ray diffraction pattern of the $Eu_{0.02}Si_{5.5}Al_{0.5}O_{0.5}N_{7.5}F_{0.04}$ compound is substantially the same as that of $\beta$-$Si_3N_4$.

Green-emitted oxynitride and nitride-based phosphors has been reviewed by R-J Xie et al. in "Silicon-based oxynitride and nitride phosphors for white LEDs—a review," published in *Science and Technology of Advanced Materials* 8 (2007), pp. 588-600. These authors report that generally speaking, nitrides as phosphors are nitrogen-containing compounds that are formed by combining nitrogen with less electronegative elements, and as in many areas of materials science where a series of compounds is investigated, the nature of the bonding of the nitrogen to its less-electronegative neighbors varies anywhere from a metallic, to an ionic, to a covalent type of bond. Covalent nitrides such as silicon nitride $Si_3N_4$, a compound upon which the present phosphors are based, are generally formed by combining nitrogen with IIIB-VB group metals.

R.-J. Xie et al. report in their review an article by Hirosaki et al., *Appl. Phys. Lett* 86 (2005) 211905, which finds that green oxynitride phosphors based on $Eu^{2+}$ doped $\beta$-SiAlON are highly suitable for use in white LEDs. This compound is structurally derived from $\beta$-$Si_3N_4$ by the equivalent substitution Al—O for Si—N, and its chemical composition may be written as $Si_{6-z}Al_zO_zN_{8-z}$, where "z" represents the number of Al—O pairs substituting for Si—N pairs. Hirosaki et al. report that these Al—O pair substitutions, z, should be greater than zero and less than or equal to 4.2; that is to say in mathematical terms, $0 < z \leq 4.2$.

The crystal structure of a $\beta$-SiAlON is hexagonal, having either the $P6_3$ or $P6_3/m$ space group. This determination was made by Y. Oyama et al. in *Jpn. J. Appl. Phys.* 10 (1971) 1673, and K. H. Jack et al. in *Nat. Phys. Sci.* 238 (1972) 28 (again, as reported by R.-J. Xie et al. in their review article). The structure is described as continuous channels parallel to the c direction. Optically, β-SiAlON:Eu$^{2+}$ produces a green emission with a peak located at 538 nm; the overall emission spectrum displaying a full-width at half-maximum of 55 nm. This photoluminescence is the result of two broad bands in the excitation spectrum centered at 303 and 400 nm. This broad excitation enables β-SiAlON:Eu$^{2+}$ to emit green light as a result of being excited by either near UV light having a wavelength range of about 400-420 nm, or by blue light having a wavelength range of about 420 to 470 nm.

R.-J. Xie investigated the effects that the amount of Al—O substitution for Si—N pairs (the z-value alluded to above), and the effects of the level of Eu$^{2+}$ activator concentration on phase formation and luminescent properties of β-SiAlON: Eu$^{2+}$ phosphors. They found that samples with lower amounts of Al—O substitution (z<1.0) displayed "higher" phase purity, smaller and more uniform particle sizes, and greater amounts of photoluminescence. See R.-J. Xie et al., *J. Electrochem. Soc.* 154 (2007) J314. In addition to these properties the β-SiAlON:Eu$^{2+}$ phosphor exhibited "low" thermal quenching; its emission intensity at 150° C. was 86% of that measured at room temperature.

Chemical Description and Structure of the Present Green-emitting β-SiAlON phosphors The present green phosphors, based on β-SiAlON ($Si_{6-z}Al_zO_zN_{8-z}$), also have a hexagonal crystal structure derived from β-$Si_3N_4$ by equivalent substitution of Al—O for Si—N. Like the Eu$^{2+}$ activated β-SiAlON described above, the present phosphors have been developed with promising results. They may be efficiently excited from 250 nm to 500 nm and emit very strong green light with emission peak wavelength at about 530 nm to 550 nm. They too have low thermal quenching, and a high stability of chromaticity against temperature, as well as a desirable lifetime stability when compared to Eu$^{2+}$ activated orthosilicates. And, like the β-SiAlON:Eu$^{2+}$ compounds alluded to above, the present phosphors are excellent choices for white LED applications.

The present green phosphors based on β-SiAlON make use of elemental substitutions not previously anticipated. In these Eu$^{2+}$ activated β-SiAlON compounds, the dopant Eu atoms are believed to be positioned in continuous, atomic lines parallel to the c-axis; this is because the Eu$^{2+}$ ion is too large to reside Si or Al sites. When a β-SiAlON is doped with divalent Eu$^{2+}$, there will be a charge unbalance if there is no anion to compensate for the europium cation. According to one embodiment of the present invention, a monovalent anion such as a halogen may be used to charge compensate for a divalent europium activator. Thus, F$^-$ may be used as a compensation anion to balance charge unbalance caused by Eu$^{2+}$ doping. It is contemplated that, for example, one atom of F$^-$ may reside substitutionally on one O$^{2-}$ site, while the remaining F$^-$ necessary for charge compensation may be positioned in the continuous atomic line parallel to the c-axis, at the origin, just like Eu$^{2+}$.

In accordance with the above theory, an inventive new green phosphor based on β-SiAlON is presented, the new phosphor having the formula $Eu_x(A1)_{6-z}(A2)_zO_yN_{8-z}(A3)_{2(x+z-y)}$, where the values of the parameters x, y, and z have the following relationships:

$$0<z\leq4.2;$$

$$0\leq y\leq z;\text{ and}$$

$$0<x\leq0.1;$$

and where the identities of the elements A1, A2, and A3 are:

A1 is selected from the group consisting of Si, C, Ge, and Sn;

A2 is selected from the group consisting of Al, B, Ga, and In; and

A3 is selected from the group consisting of F, Cl, Br, and I.

The new set of compounds described by $Eu_x(A1)_{6-z}(A2)_zO_yN_{8-z}(A3)_{2(x+z-y)}$ have the same structure as β-$Si_3N_4$, as will be demonstrated shortly with x-ray diffraction data. Both elements A1 and A2 reside on Si sites, and both O and N occupy the nitrogen sites of the β-$Si_3N_4$ crystal structure. Eu$^{2+}$ are considered to exist in a continuous atomic line parallel to the c-axis at the origin. A molar quantity (z−y) of the A3$^{-0}$ anion (defined as a halogen) will also reside on an N site, and the remaining (2x+z−y) moles of A3$^-$ may exist continuously, atomically parallel to the c-axis at the origin just like Eu$^{2+}$.

Figure 7:
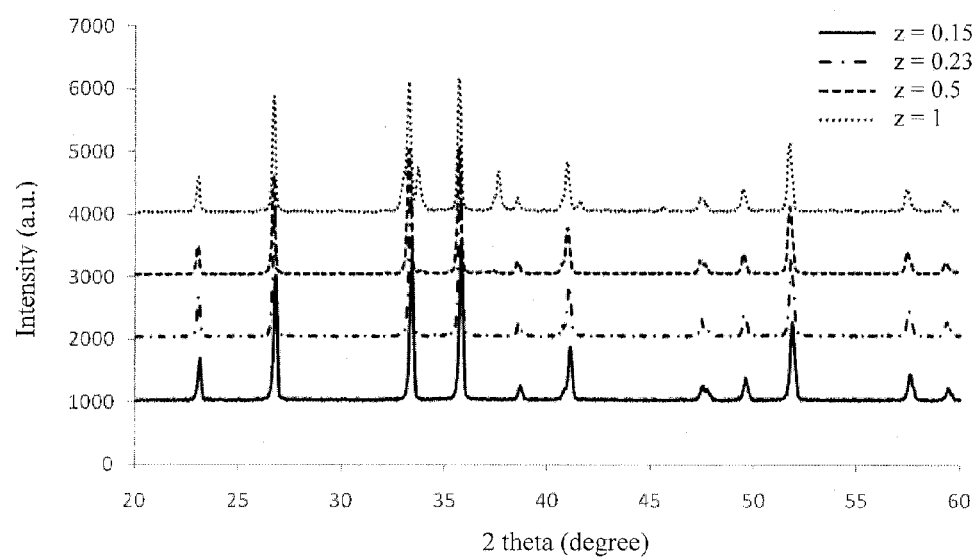
FIG. 7 is an x-ray diffraction pattern of a phosphor having the compositions $Eu_{0.02}Si_{6-z}Al_zO_zN_{8-z}F_{0.04}$ and different z values: the prepared samples consist of a substantially pure $\beta$-SiAlON crystalline phase when z is equal or less than 0.5, and when the z-value is as large as 0.5, trace amounts of AlN and 15R AlN-polytypoid impurity phases exist in the sample.

The crystal structure and morphology of prepared samples were investigated by x-ray diffractometry, with an Rigaku MiniFlex instrument, using Cu Kα radiation as the source of the x-rays, and a JEOL JSM-6330F field emission scanning electron microscope for determining morphology. FIG. 1 is an x-ray diffraction pattern of a phosphor having the composition $Eu_{0.02}Si_{5.5}Al_{0.55}O_{0.5}N_{7.5}F_{0.04}$. This figure shows that the x-ray diffraction pattern of the $Eu_{0.02}Si_{5.5}Al_{0.5}O_{0.5}N_{7.5}F_{0.04}$ compound is substantially the same as that of β-$Si_3N_4$. FIG. 7 is an x-ray diffraction pattern of a phosphor having the compositions $Eu_{0.02}Si_{6-z}Al_zO_zN_{8-z}F_{0.04}$ and different z values: the prepared samples consist of a substantially pure β—SiAlON crystalline phase when z is equal or less than 0.5, and when the z value is as large as 0.5, trace amounts of AlN and 15R AlN-polytypoid impurity phases exist in the sample.

Excitation Spectra of the Present β-SiAlON Based Green Phosphors

When used in white LEDs, green-emitting phosphors receive excitation radiation from an ultraviolet, near ultraviolet, or blue emitting LED to cause the phosphor to photoluminescence. The excitation spectra of the present samples were measured using a Fluorolog3 Research Spectrofluorometer (Horiba Jobin YVON) using a xenon arc lamp as an excitation source.

Figure 2:
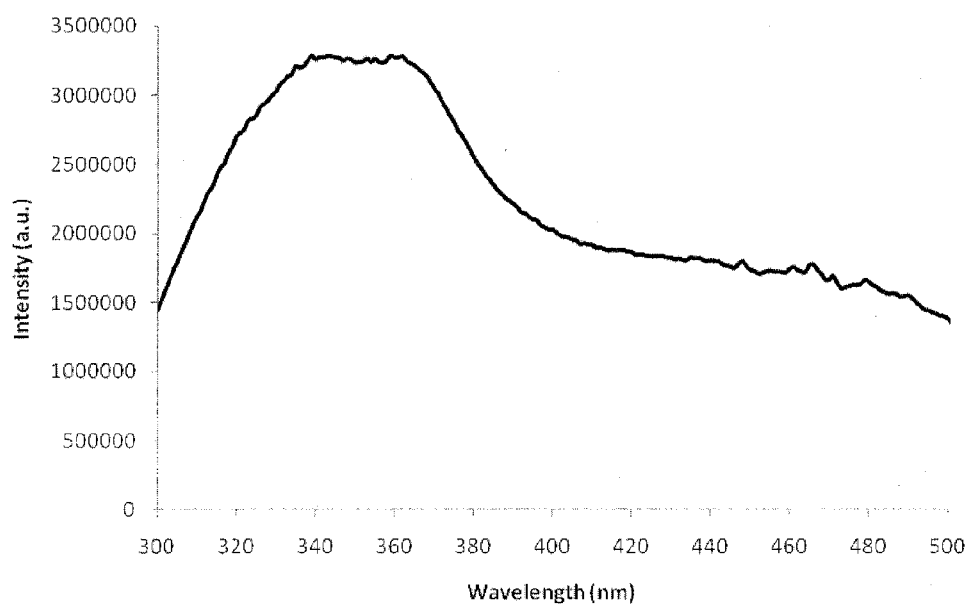
FIG. 2 is the excitation spectra of a phosphor having the composition $Eu_{0.02}Si_{5.5}Al_{0.5}O_{0.5}N_{7.5}F_{0.04}$, showing that the phosphor may be effectively excited from 250 nm to 500 nm.

FIG. 2 is the excitation spectra of a phosphor having the composition $Eu_{0.02}Si_{5.5}Al_{0.5}O_{0.5}N_{7.5}F_{0.04}$, showing that the phosphor may be effectively excited from 250 nm to 500 nm. Interestingly, this excitation spectra does not prominently delineate two broad bands in the excitation spectrum centered at 303 and 400 nm of the control β—SiAlON: Eu$^{2+}$ compound, as described by R.-L. Xie et al. in the discussion above, instead showing a more constant absorption/excitation between about 330 nm and 370 nm.

Emission Spectra of the Present β-SiAlON Based Green Phosphors

The PL spectra of the prepared samples were measured using an Ocean Optics USB2000 spectrometer excited by a 450 nm LED. Exemplary emission spectra from the present β-SiAlON based green phosphor compounds are presented in FIGS. 3-6.

Figure 3:
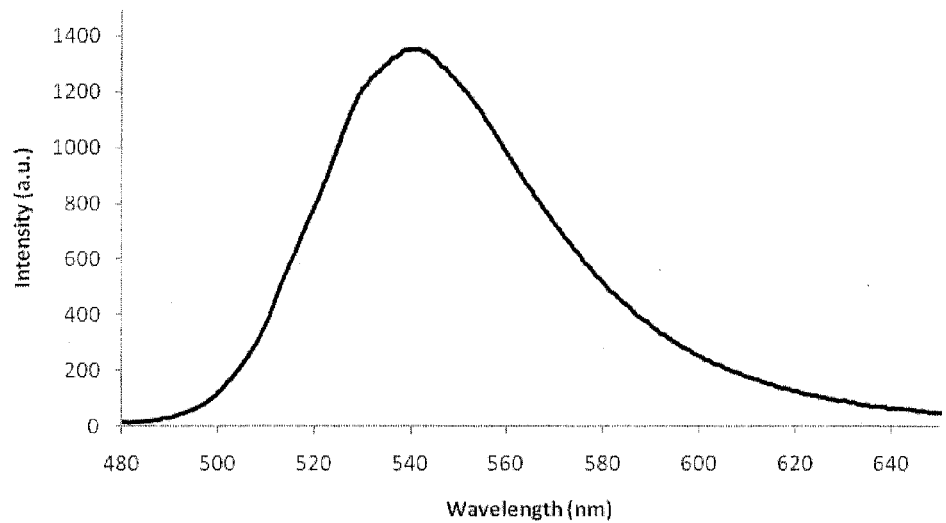
FIG. 3 is the an emission spectra of a phosphor having the composition $Eu_{0.02}Si_{5.5}Al_{0.5}O_{0.5}N_{7.5}F_{0.04}$.

FIG. 3 is the an emission spectra of a phosphor having the composition $Eu_{0.02}Si_{5.5}Al_{0.5}O_{0.5}N_{7.5}F_{0.04}$. This fluorine-containing β-SiAlON displays a peak emission at a wavelength slightly longer than 540 nm, with a broad emission between about 520 and 580 nm.

Figure 4:
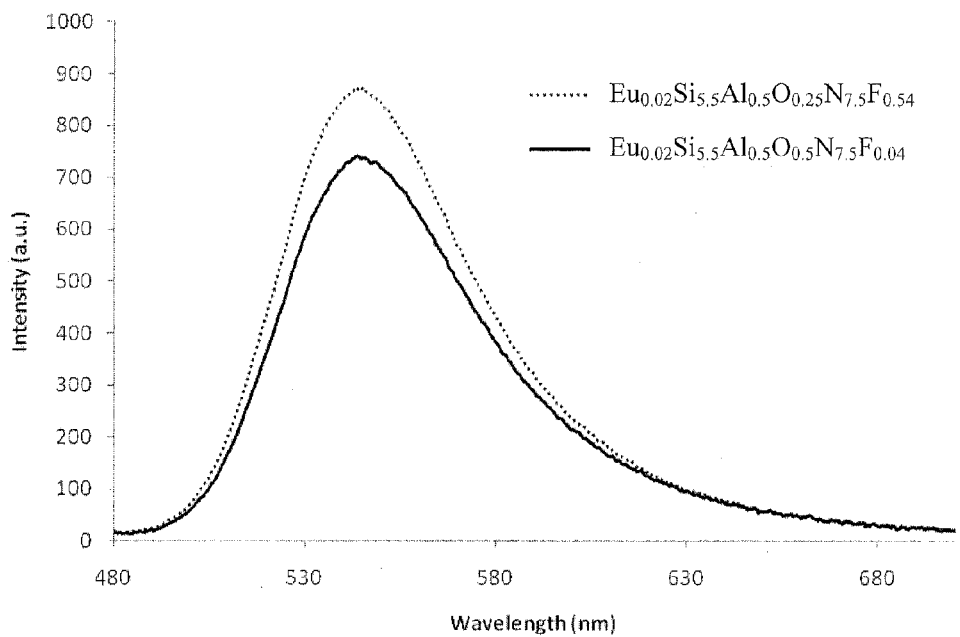
FIG. 4 is the emission spectra of phosphors having the composition $Eu_{0.02}Si_{5.5}Al_{0.5}O_{0.250}N_{7.5}F_{0.54}$ and $Eu_{0.02}Si_{5.5}Al_{0.5}O_{0.5}N_{7.5}F_{0.04}$, showing that the photoluminescence of the $Eu_{0.02}Si_{5.5}Al_{0.5}O_{0.25}N_{7.5}F_{0.54}$ phosphor is higher than that of the $Eu_{0.02}Si_{5.5}Al_{0.5}O_{0.5}N_{7.5}F_{0.04}$ phosphor, which suggests that the lower the oxygen content in the present compounds, the higher the photoluminescence.

FIG. 4 is an emission spectra of two phosphors having the compositions $Eu_{0.02}Si_{5.5}Al_{0.5}O_{7.5}F_{0.54}$ and $Eu_{0.02}Si_{5.5}Al_{0.5}O_{0.5}N_{7.5}F_{0.04}$. The graph shows that the photoluminescence of the $Eu_{0.02}Si_{5.5}Al_{0.5}O_{0.25}N_{7.5}F_{0.04}$ phosphor is higher than that of the $Eu_{0.02}Si_{5.5}Al_{0.5}O_{0.5}N_{7.5}F_{0.04}$ phosphor in these β-SiAlON based compounds, suggesting that the lower the oxygen content, the higher the photoluminescence. It is noted that the peak emission wavelength is still centered between about 530 and 580 nm.

Figure 5:
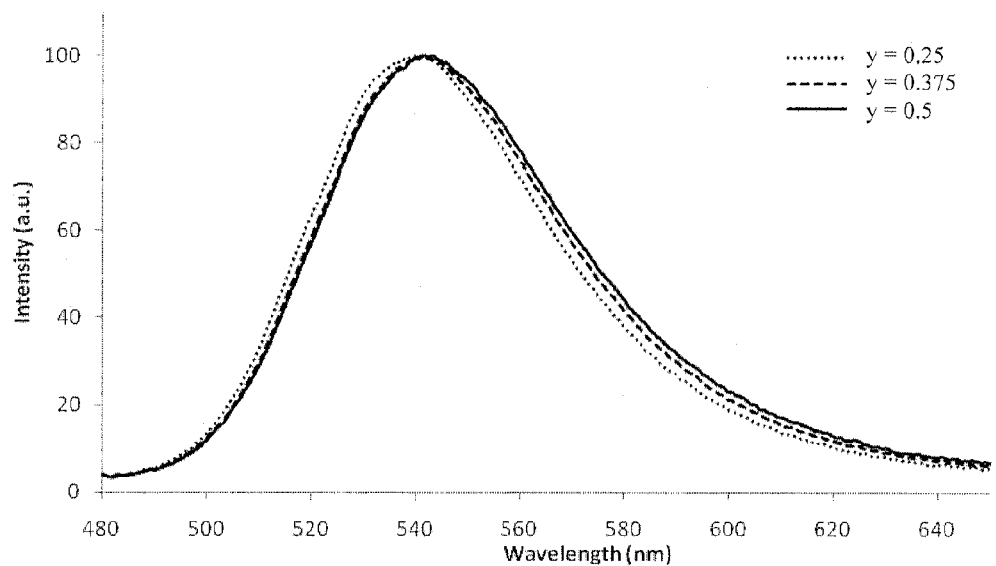
FIG. 5 shows normalized emission spectra of phosphors with compositions given by $Eu_xSi_{6-z}Al_zO_yN_{8-z}F_{2(x+z-y)}$, with the same z and x values Z=0.5, x=0.02) but different oxygen concentrations; the results show that the emission peak wavelength shifts a few nanometers to shorter wavelengths with the decreasing oxygen concentrations.

FIG. 5 is an emission spectra of a phosphor having the composition $Eu_xSi_{6-z}Al_zO_yN_{8-z}F_{2(x+z-y)}$, showing variation of oxygen concentration for the same "z" and "x" values (z=0.5; x=0.02). These results show that the emission peak wavelength shifts a few nanometer toward shorter wavelengths with the decreasing oxygen concentrations; that is to say, with decreasing y values.

Figure 6:
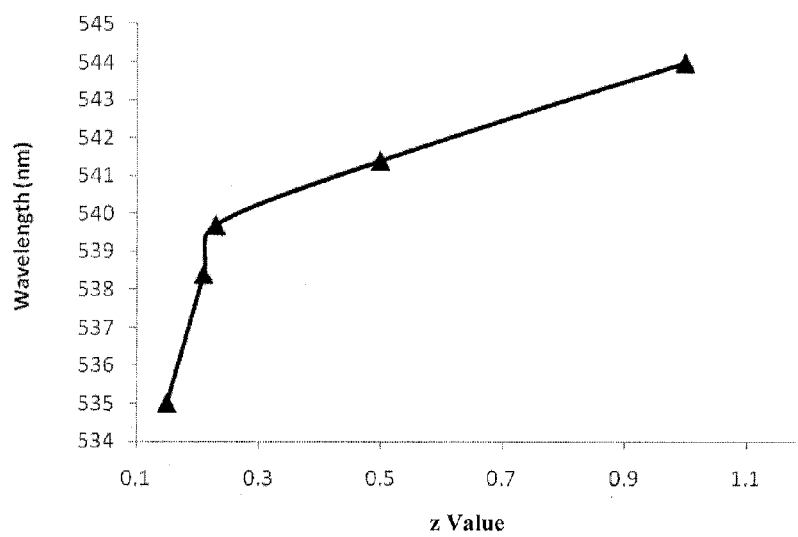
FIG. 6 shows the relationship of the z value and emission peak wavelength in phosphors having the general composition $Eu_{0.02}Si_{6-z}Al_zO_zN_{8-z}F_{0.04}$; these results show that the phosphor emission peak wavelength increases with the increase of z value at the same europium concentration.

FIG. 6 shows the relationship of the z value, the degree to which Si—N pairs have been substituted for by Al—O pairs, and emission peak wavelength, in phosphors having the general composition $Eu_{0.02}Si_{6-z}Al_zO_zN_{8-z}F_{0.04}$. These results show that the phosphor's peak emission wavelength increases as "z" increases, all else (such as the europium concentration) remaining constant. A "knee" in the curve, at a z-value between 0.2 and 0.3, shows unexpected results for this fluorine containing β-SiAlON based compound.

Synthesis of the Present β-SiAlon Based Green Phosphors

Appropriate amounts of certain starting raw materials were weighed out and mixed well by either dry ball milling or wet ball milling. The powder mixture was then packed into BN crucibles and sintered in a gas pressure furnace with a graphite heater. The samples were heated at a constant heating rate of 10° C./min under $10^{-2}$ Pa, in vacuum, first from room temperature to 600° C., and then to 800° C. When heating between the 600° C. to 800° C. temperatures, high purity $N_2$ gas was introduced into the chamber to increase the gas pressure from 0.5 MPa to 1.0 MPa. Simultaneously, the temperature was raised from 1900° C. to 2000° C., utilizing the same heating rate of 10° C./min. The samples were maintained at a temperature of 1900° C. to 2000° C. for 2 to 8 hours under a $N_2$ gas pressure of 0.5 MPa to 1.0 MPa. After firing, the power was shut off, and the samples were allowed to cool in the furnace.

What is claimed is:

1. A β-SiAlON:$Eu^{2+}$ based green emitting phosphor having the formula $Eu_x(A1)_{6-z}(A2)_zO_yN_{8-z}(A3)_{2(x+z-y)}$, where the parameters x, y, and z have the values:
   0<z≤4.2;
   0≤y≤z; and
   0<x≤0.1;
and where
   A1 is selected from the group consisting of Si, C, Ge, and Sn;
   A2 is selected from the group consisting of Al, B, Ga, and In; and
   A3 is selected from the group consisting of F, Cl, Br, and I.

2. The β-SiAlON:$Eu^{2+}$ based green emitting phosphor of claim 1, wherein the A1 and A2 elements reside substantially on silicon (Si) sites.

3. The β-SiAlON:$Eu^{2+}$ based green emitting phosphor of claim 1, wherein a quantity (z–y) of the A3⁻ anion resides on nitrogen (N) sites.

4. The β-SiAlON:$Eu^{2+}$ based green emitting phosphor of claim 1, wherein the phosphor has the formula $Eu_{0.02}Si_{5.5}Al_{0.5}O_{0.5}N_{7.5}F_{0.04}$.

5. The β-SiAlON:$Eu^{2+}$ based green emitting phosphor of claim 1, wherein the phosphor has the formula $Eu_{0.02}Si_{5.5}Al_{0.5}O_{0.25}N_{7.5}F_{0.54}$.

6. The β-SiAlON:$Eu^{2+}$ based green emitting phosphor of claim 1, wherein z is equal to y.

7. The β-SiAlON:$Eu^{2+}$ based green emitting phosphor of claim 6, wherein z is between 0.2 and 0.3.

8. The β-SiAlON:$Eu^{2+}$ based green emitting phosphor of claim 1, wherein 0.15 <z ≤1.0.

9. The β-SiAlON:$Eu^{2+}$ based green emitting phosphor of claim 1, wherein 0.15 <z≤0.5.

10. The β-SiAlON:$Eu^{2+}$ based green emitting phosphor of claim 1, wherein 0.5 <z ≤1.0.

11. The β-SiAlON:$Eu^{2+}$ based green emitting phosphor of claim 1, wherein 0.25 <y ≤0.5.

12. The β-SiAlON:$Eu^{2+}$ based green emitting phosphor of claim 1, wherein the β-SiAlON:$Eu^{2+}$ based green emitting phosphor has a peak photoluminescence emission intensity between 530 nm and 580 nm when excited by a 450 nm LED.

* * * * *